Figure 1:
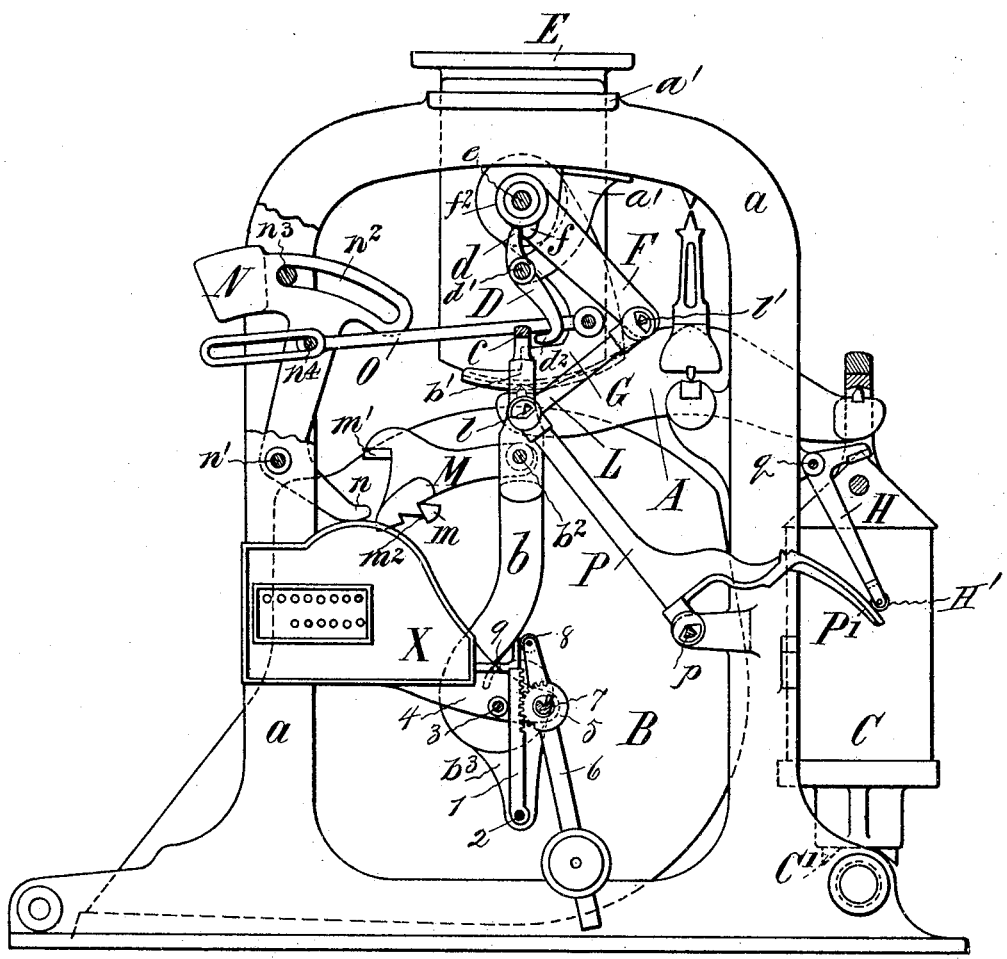

No. 637,896. Patented Nov. 28, 1899.
M. E. REISERT.
AUTOMATIC WEIGHING APPARATUS.
(Application filed Dec. 24, 1897.)

(No Model.) 2 Sheets—Sheet 1.

Witnesses.
B. S. Ober.
A. D. Sommers.

Inventor
Michael Edward Reisert,
by
Atty.

THE NORRIS PETERS CO., PHOTO-LITHO., WASHINGTON, D. C.

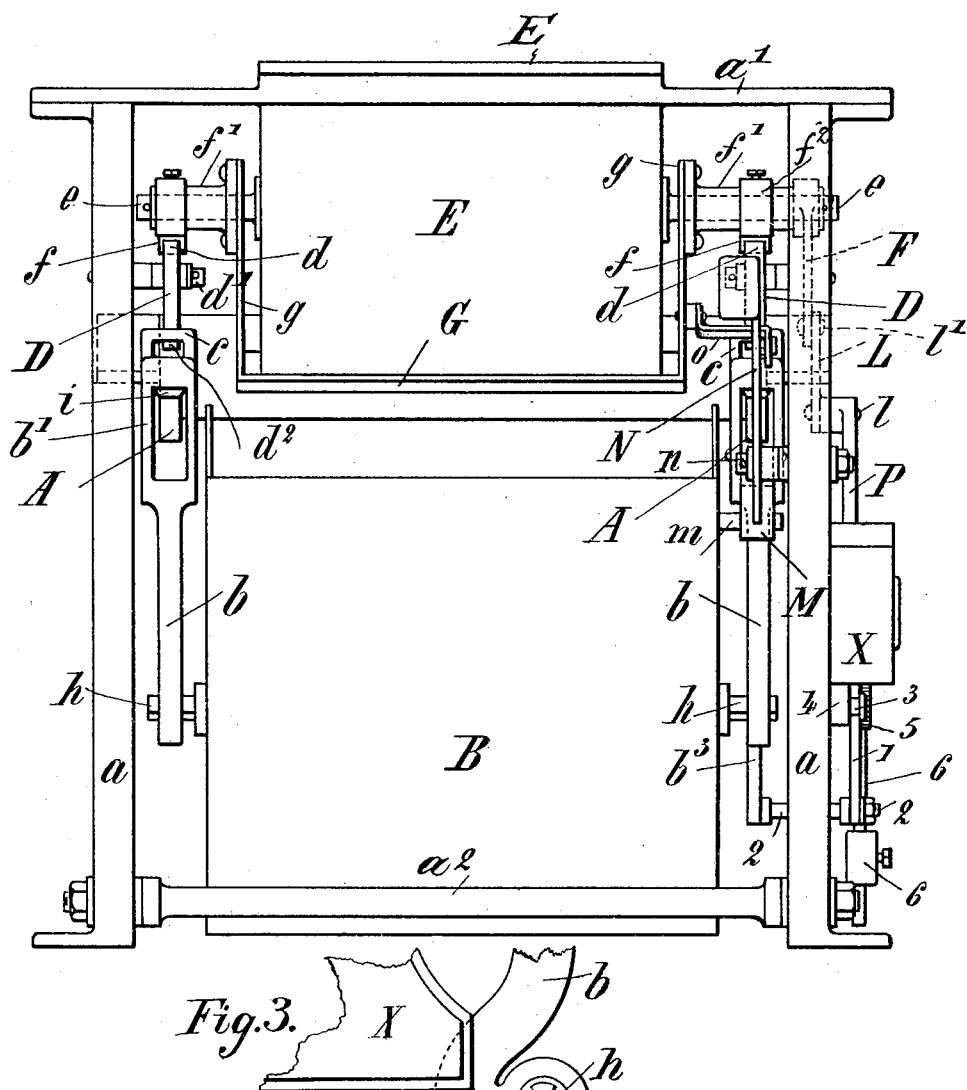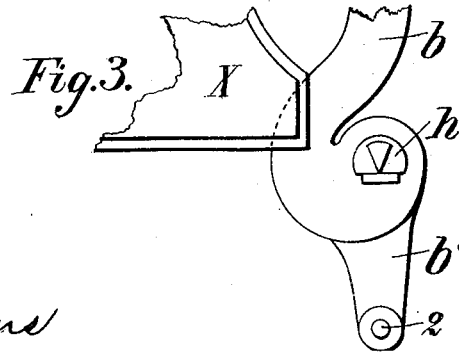

UNITED STATES PATENT OFFICE.

MICHAEL EDUARD REISERT, OF HENNEF-ON-THE-SIEG, GERMANY.

AUTOMATIC WEIGHING APPARATUS.

SPECIFICATION forming part of Letters Patent No. 637,896, dated November 28, 1899.

Application filed December 24, 1897. Serial No. 663,378. (No model.)

*To all whom it may concern:*

Be it known that I, MICHAEL EDUARD REISERT, a subject of the German Emperor, and a resident of Hennef-on-the-Sieg, in the Empire of Germany, have invented certain new and useful Improvements in Automatic Weighing Apparatus, (for which I have obtained a patent in Germany, No. 82,502, dated May 12, 1894, and in Great Britain, No. 19,887, dated October 18, 1894,) of which the following is a specification.

My invention has relation to that class of automatic weighing apparatus for weighing granular substances and substances the more or less coarse particles or lumps of which are of irregular size and in which the material to be weighed is fed to the scale-receptacle from a hopper the opening and closing of which is controlled by the movements of the scale-beam, the receptacle for the material being self-emptying and self-righting.

The invention has for its object the provision of means whereby a more exact weighing is obtained in that the action on the scale-beam of the live force of the material to be weighed and flowing from the hopper to the scale receptacle or pan is avoided.

In the accompanying drawings, Figure 1 is a front elevation, partly in section, of a weighing apparatus embodying my invention and illustrating the operative devices in the respective positions they occupy just before the feed-cut-off gate closes the outlet of the feed-hopper to cut off the supply of material to the scale-receptacle. Fig. 2 is a side elevation of said apparatus, and Fig. 3 a detail view.

The apparatus and its operative mechanisms are supported from a suitable framing consisting of two vertical front and rear frames $a$, connected together at their upper end by a top plate $a'$ and near their lower end by tie-rods $a^2$. In an opening in said top plate $a'$ is suspended the feed-hopper E, provided at opposite ends with a stud-bearing $e$, on which are mounted journals $f'$, rigidly secured to arms $g$ of the cut-off gate G, adapted to swing on said bearings $e$ to open or close the outlet of said hopper E. On each journal $f'$ is adjustably secured a collar or sleeve $f^2$, having a projection or cam $f$, and on said sleeve $f^2$ at the front end of the apparatus is secured a radial arm F, pivoted to one end of a connecting-rod L, the opposite end of which is similarly connected to the free end of the longer arm P of an angle-lever fulcrumed at $p$ to a projection on the front frame $a$ of the machine, the short arm P′ of said lever having a convex bearing-face in the path of a roller H′ on the free end of the longer arm of a bell-crank lever H, fulcrumed at $q$ to a stud on said front frame $a$, and whose shorter arm lies in the path of the weighted end of the scale-beam A.

As shown in Fig. 1, and with a view to reduce friction, I preferably fulcrum the lever P P′ on a knife-edge bearing and provide similar bearings at the points of connection between the rod L and the lever-arm P and said rod L and the radial arm F, as shown at $l\,l'$, Fig 1.

The scale-beam A consists, as is common in this type of apparatus, of two beams or levers fulcrumed, as usual, on knife-edges having their bearing on suitable blocks secured in arms projecting from the front and rear frames $a$, and from the tails of said beams is suspended the weight-pan C, having bifurcated extensions adapted to contact with stops C′, which may be one of the tie-rods $a^2$, and which serves to limit the downward movement of the scale-beam and supports the weight thereon in a well-known manner, the weight-pan being likewise supported from knife-edges having bearing on the arms of the scale-beams.

The pan or receptacle B for the material to be weighed is suspended on knife-edges $h$, Fig. 3, from the lower end of hangers $b$, whose upper end is slotted and provided with knife-edges $i$, which have bearing on the arms of the scale-beam A, as more plainly shown in Fig. 2, and at its upper end each of said hangers has a vertically-slotted extension $c$, adapted to be engaged by the hook end $d^2$ of the longer arms of levers D, fulcrumed at $d'$ to arms depending from the end frames $a$, the shorter arms of said levers D lying in the path of the cams on the cam-sleeves $f^2$.

To the front face of the hopper-gate G is pivoted a rod O, whose outer end is slotted longitudinally, and into said slot projects a pin $n^4$ on a weighted trip-lever N, fulcrumed at $n'$ to the front frame $a$, said lever having a segmental slot $n^2$ concentric with its axis of rotation, into which slot projects a stud or pin $n^3$ on said front frame, said pin serving to limit the oscillation of the lever in one or the other direction. The trip-lever N is a two-armed lever. Its shorter arm $n$ extends within reach of the shoulder $m'$ on the free end of a locking-latch M, whose under face has a tooth $m^2$, adapted to engage a prismatic lug or stud $m$, projecting from the front end of the receptacle B, which is supported from the hangers $b$, so as to swing in one direction under a load to dump the same and then right itself, as is common in this class of weighing apparatus, the latch M being pivoted to the front hanger $b$ at $b^2$, Fig. 1.

To the front frame $a$ of the apparatus is secured the casing X, which contains the registering mechanism of a well-known description and operated by a rod 9, adapted to impart a step-by-step rotation to the prime motor-wheel of said mechanism in a well-known manner, said rod being negatively moved by a suitable spring, as usual, while its outer bent end or shoe has bearing on a roller 8, journaled in the short arm of a weighted lever 6, fulcrumed on a knife-edge having bearing on a suitable block secured to an extension 4 from the casing X, said lever having secured thereto a segment-gear 5 concentric with its axis of rotation and gearing with a rack-bar 1, pivoted to a pin 2, projecting from a downwardly-extending arm $b^3$ of the hanger $b$ and guided by a roller 3 on the aforesaid extension 4.

The operation of the apparatus is as follows: It has been stated that the mechanism is shown in Fig. 1 in the position it occupies when the hopper-gate G is about to close the discharge end of the hopper E. Let it, however, be assumed that the hopper-gate G completely uncovers the discharge end of the hopper, in which case the lever-arms P P' and connecting-rod L are nearly in line with one another, while the radial arm F is in a nearly horizontal position, and are held in that position by the pressure of the weighted end of the scale-beam A on the short arm of the bell-crank lever H, the hook end $d^2$ of the levers D engaging the eye or slot in the extension $c$ of hangers $b$. This eye or vertical slot is of such a length as to allow the vessel B to drop a certain distance under the weight of the material therein—namely, to a position wherein it balances or nearly balances the weight or weights on the weight-pan C—and as it thus descends and the weighted end of the beam A ascends the bell-crank lever H is relieved of the pressure thereon of said weighted end, so that the cut-off gate can freely swing from right to left on the hopper-bearings $e$, the feed of material being gradually cut off. As the scale-beam A is about to reach its balanced position the gate has moved to completely cut off the feed, the cams $f$ have acted upon the levers D to disengage their hook ends from the slot in extensions $c$ of hangers $b$, and the receptacle B is thus in a position to tilt over to empty its contents were it not locked against such movement by the latch M. However, inasmuch as the gate G is connected by slotted rod O to the tripping-lever N, as the gate swings to cut off the feed said lever is gradually tilted or swung in the same direction, and the arrangement is such that as soon as the feed is completely cut off the detent-lever will have been moved over its dead-center toward the left and drop under its own weight, its short arm $n$ acting upon the shoulder $m'$ of latch M and disengaging the same from the prismatic lug or stop $m$, thus allowing the receptacle M to tilt over. Furthermore, as said vessel M descends under its load the rack-bar 1, moving with the hanger $b$, acts upon the segment-gear 5 and causes the longer weighted arm of said lever to swing toward the right and the short arm carrying roller 8 toward the left, thereby causing the actuating-rod 9 of the registering mechanism in the box X to move inwardly and impart a partial rotation to the prime mover of said mechanism. After the vessel has discharged its load and again rises under the weight on the scale-beam the weighted lever 6 swings back to a normal position, while the actuating-rod 9 is returned to its normal position—i. e., toward the right—by its actuating-spring. The length of the slot in rod O is of course such that as the receptacle B again rises to its normal position, during which movement the latch moves out of engagement with arm $n$ of tripping-lever N, the latter is swung back to its normal position beyond its dead-center toward the right, Fig. 1.

It will be observed that in the operation described, after the receptacle B has commenced to descend under its load and is about to reach a position in which the scale-beam A is balanced, said vessel is held against further downward movement for a moment by the levers D, so that the live force of the small quantity of material still flowing into said vessel to complete its exact weight has practically no influence thereon, thus avoiding short weights, the feed being immediately thereafter, or as soon as the scale-beam is balanced, entirely cut off.

Having thus described my invention, what I claim as new therein, and desire to secure by Letters Patent, is—

1. In a weighing-machine such as described, the combination with the scale-beam, the feed-hopper, a cut-off gate therefor, and the receptacle for the material to be weighed; of a radial arm on one of the journals of the gate, an angle-lever pivotally connected with said radial arm through a connecting-rod, and a bell-crank lever the longer arm of which has bearing on the shorter arm of said angle-lever, the shorter arm of the bell-crank lever having bearing on the weighted end of the scale-beam, for the purposes set forth.

2. In a weighing-machine such as described, the combination with the scale-beam, the receptacle for the material to be weighed, a locking-latch for locking said receptacle against downward movement and against tilting after it has dropped to a predetermined point under a load, a feed-hopper, a cut-off gate therefor, and mechanism operated by the scale-beam for opening and closing said gate during the ascending and descending movements of the receptacle, respectively; of a weighted tripping-lever operated by and during the closing movement of the gate to trip the latch and release the receptacle, said lever being returned to a normal position by and during the opening of said gate, for the purposes set forth.

3. In a weighing-machine such as described, the combination with the scale-beam, the receptacle for the material to be weighed suspended by hangers from said beam, and the actuating-rod for the prime mover of a registering mechanism; of a two-armed weighted lever fulcrumed on a fixed pivot, the short arm of which lever has bearing on the aforesaid actuating-rod, and means connected with one of the hangers for oscillating the lever during the descending and ascending movements of said hanger, for the purpose set forth.

4. In a weighing-machine such as described, the combination with the scale-beam, the receptacle for the material to be weighed suspended by hangers from said beam, and the actuating-rod for the prime mover of a registering mechanism; of a two-armed weighted lever fulcrumed on a fixed pivot, the short arm of which lever has bearing on the aforesaid actuating-rod, said lever carrying a segment-gear, a rack-bar pivoted to one of the aforesaid hangers and gearing with said segment-gear, and a rolling abutment for said rack-bar to hold the same in gear with said segment-gear, substantially as and for the purpose set forth.

5. In a weighing-machine such as described, the combination with the scale-beam, the receptacle for the material to be weighed, a feed-hopper, a cut-off gate therefor, and mechanism for opening and closing said gate during the ascending and descending movements of said receptacle respectively, of means controlled by said gate for momentarily arresting the downward movement of the receptacle as the scale-beam is about to equipoise and before the gate is closed, and releasing appliances operated likewise by the gate when the latter is about to close for releasing said receptacle, for the purpose set forth.

6. In a weighing-machine such as described, the combination with the scale-beam, the receptacle for the material to be weighed, a feed-hopper, a cut-off gate, mechanism to open and close said gate during the ascending and descending movements of the receptacle respectively; of a locking-latch for locking said receptacle against downward motion and against tilting after having dropped to a predetermined position, a stop device for arresting the downward movement of said receptacle when the scale-beam is about to equipoise, and mechanism operated by the gate during its closing movement to first release the stop device when said gate is about to close, and then release the locking-latch, for the purpose set forth.

7. In a weighing-machine such as described, the combination with the scale-beam, the receptacle for the material to be weighed, the hangers b from which said receptacle is suspended and by which it is suspended from the scale-beam, said hangers having a vertically-slotted extension c; of a feed-hopper, a cut-off gate therefor, mechanism operated by the scale-beam during the ascending and descending movements of the said receptacle to respectively open and close said gate, levers D fulcrumed to the hopper adapted to engage the slots in the aforesaid hanger extensions c when the receptacle ascends, and cams on the gate-journals acting upon levers D to disengage the same from the aforesaid slots just before the gate closes, substantially as and for the purpose set forth.

In testimony that I claim the foregoing as my invention I have signed my name, in presence of two witnesses, this 11th day of December, 1897.

MICHAEL EDUARD REISERT.

Witnesses:
WILLIAM H. MADDEN,
KÄTCHEN STENZ.